US008622674B2

(12) United States Patent
Shibata

(10) Patent No.: US 8,622,674 B2
(45) Date of Patent: Jan. 7, 2014

(54) CONNECTOR

(75) Inventor: Takahiro Shibata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 75 days.

(21) Appl. No.: 13/405,813

(22) Filed: Feb. 27, 2012

(65) Prior Publication Data

US 2012/0224932 A1 Sep. 6, 2012

(30) Foreign Application Priority Data

Mar. 4, 2011 (JP) ................................ 2011-048049

(51) Int. Cl.
*F16B 33/00* (2006.01)

(52) U.S. Cl.
USPC ......................... 411/366.1; 411/105; 411/337

(58) Field of Classification Search
USPC .............. 411/103, 105–109, 259, 337, 366.1, 411/371.1, 383, 925, 929
See application file for complete search history.

(56) References Cited

U.S. PATENT DOCUMENTS

| | | | | |
|---|---|---|---|---|
| 3,295,578 | A * | 1/1967 | Maloof | 411/105 |
| 4,772,448 | A * | 9/1988 | Popalis et al. | 376/463 |
| 4,861,207 | A * | 8/1989 | Do | 411/104 |
| 5,096,349 | A * | 3/1992 | Landy et al. | 411/108 |
| 2004/0234355 | A1* | 11/2004 | Bas | 411/108 |
| 2011/0182694 | A1 | 7/2011 | Nishikawa et al. | |

FOREIGN PATENT DOCUMENTS

| | | |
|---|---|---|
| EP | 1437802 | 7/2004 |
| JP | 1154203 | 2/1999 |
| JP | 2010-277832 | 12/2010 |

* cited by examiner

*Primary Examiner* — Roberta Delisle

(74) *Attorney, Agent, or Firm* — Gerald E. Hespos; Michael J. Porco; Matthew T. Hespos

(57) ABSTRACT

A connector includes a support (14) made of synthetic resin and constituting a first housing (10), a bolt (20) rotatably penetrating through the support (14), a seal ring (29) mounted between the supporting portion (14) and a head (22) of a bolt (20), a metal nut (36) embedded in the front surface of a second housing (30) and connecting the two housings (10, 30) by being threadably engaged with the bolt (20), and a stopper for preventing a threaded movement of the bolt (20) by bringing the metal parts into contact.

7 Claims, 7 Drawing Sheets

CONNECTOR

BACKGROUND OF THE INVENTION

1. Field of the Invention

The invention relates to a connector.

2. Description of the Related Art

Japanese Unexamined Patent Publication No. 2010-277832 discloses a connector including a first housing and a second housing to be connected to the first housing with front surfaces of the two housings facing each other. A metal nut is embedded in the front surface of the first housing. The second housing has a support made of synthetic resin and is formed with an insertion hole that penetrates from the front surface to the rear surface of the second housing and a metal bolt penetrates through the insertion hole. The two housings are fit lightly together and the bolt is threaded into the nut and tightened so that the two housings are held in a connected state with the support held between a head of the bolt and the nut. Further, a seal ring is mounted between the rear surface of the support and the head portion of the bolt to prevent water from entering a clearance between the inner periphery of the insertion hole and the outer periphery of the bolt.

The support and the seal ring are held strongly between the head of the bolt and the nut as the bolt is tightened. The support is made of synthetic resin and has higher rigidity than the seal ring. Thus, the seal ring is deformed and squeezed. The squeezing amount of the seal ring varies depending on bolt tightening strength. Hence, the squeezing amount of the seal ring is not constant and sealing performance by the seal ring may become unstable if a bolt tightening force varies.

The invention was completed in view of the above situation and an object thereof is to stabilize sealing performance.

SUMMARY OF THE INVENTION

The invention relates to a connector with first and second housings that can be connected to one another with front surfaces of the housings facing one another. A support is provided at the front surface of the first housing. An insertion hole penetrates through the support and continues to the rear surface of the first housing. A metal bolt rotatably penetrates the insertion hole. A seal is mounted between the rear end surface of the support and a head of the bolt. A metal nut is retained in the second housing and is threadedly engaged with the bolt to connect the first and second housings. A stopper means is provided for preventing a threaded movement of the bolt by bringing metal parts into contact with each other.

The tightening amount of the bolt is specified by the contact of the metal parts in the stopper means with the bolt tightened and the two housings connected. Thus, the squeezing amount of the seal ring is stable and a stabilized sealing performance by the seal ring can be realized.

The support preferably is made of synthetic resin.

The metal nut preferably is embedded in the front of the second housing.

The stopper means preferably is formed to directly bring an end portion of an externally threaded portion formed on the bolt into contact with an end portion of an internally threaded portion formed in the nut. Thus, the bolt and the nut can be utilized effectively while remaining in existing shapes.

An axial depth of an internally threaded portion of the nut preferably is longer than the axial length of an externally threaded portion of the bolt.

The bolt preferably is retained at the first housing by the contact of a retaining ring and a locking surface of the housing and is allowed to rotate relative to the first housing by sliding in contact with the inner peripheral surface of the support.

The first housing includes a first frame. First sub housings are assembled into the first frame and one or more terminal fittings are inserted into the first sub housings. The support is integral or unitary with the frame.

The nut is mounted in a tubular mounting portion of the second housing with relative movements in the axial direction and/or rotation about the axial line prevented.

These and other objects, features and advantages of the invention will become more apparent upon reading the following detailed description of preferred embodiments and accompanying drawings.

DETAILED DESCRIPTION OF THE PREFERRED EMBODIMENTS

Figure 1:
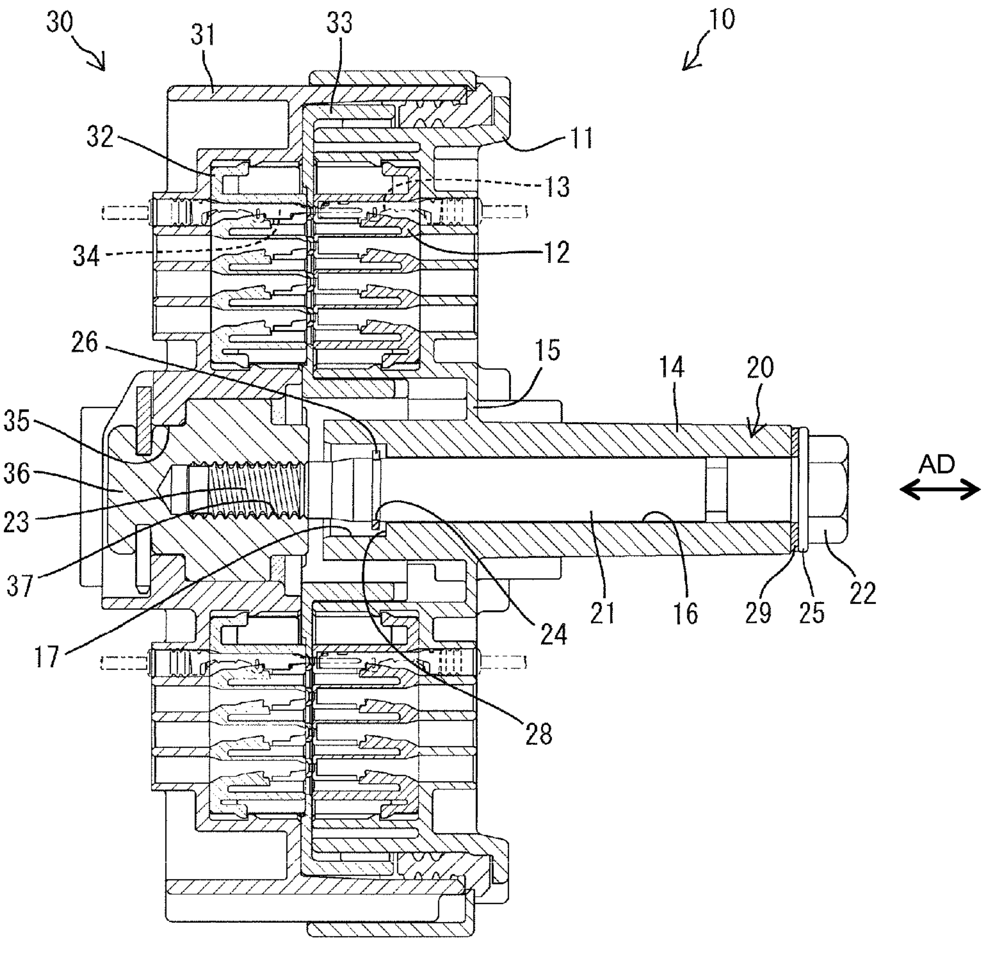
FIG. 1 is a section showing a state where a first housing and a second housing are connected in one embodiment.

A connector in accordance with the invention is illustrated in FIGS. 1 to 7 and includes first and second housings 10 and 30 that are connected using a bolt 20 and a nut 36 as shown in FIG. 1. A connecting side of the first housing 10 with the second housing 30 is referred to herein as the front.

Figure 2:
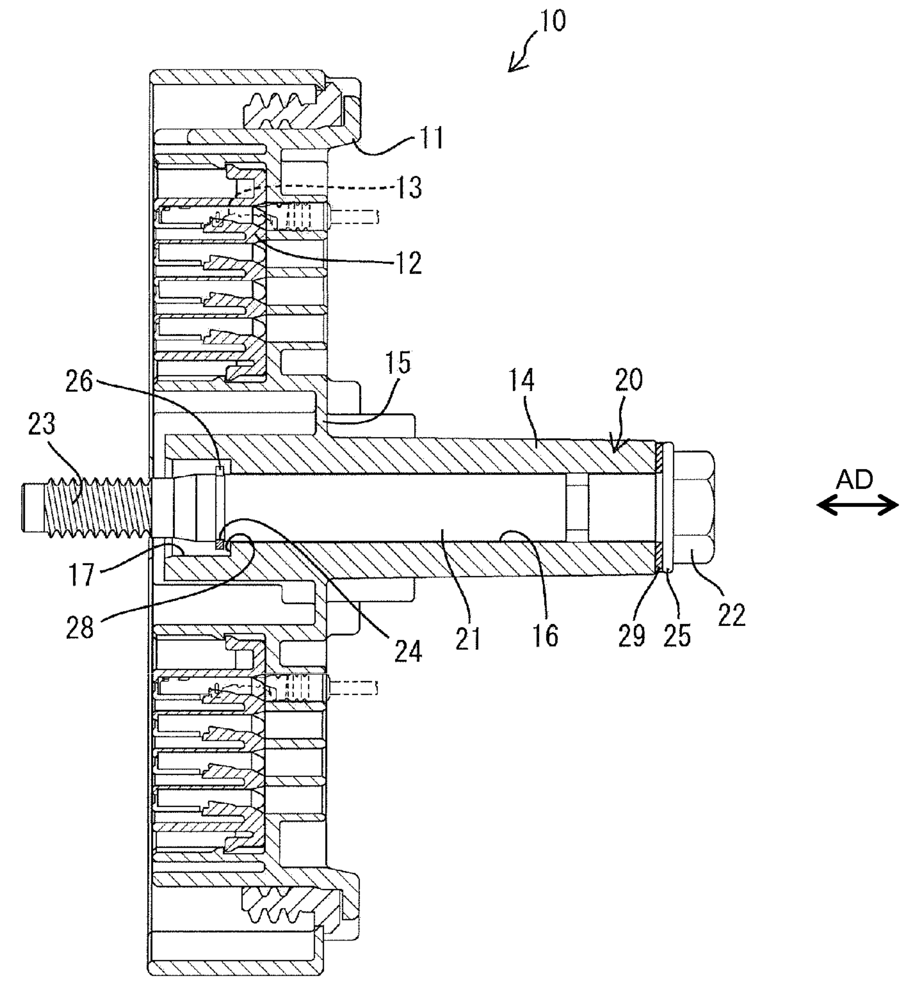
FIG. 2 is a section of the first housing.
Figure 6:
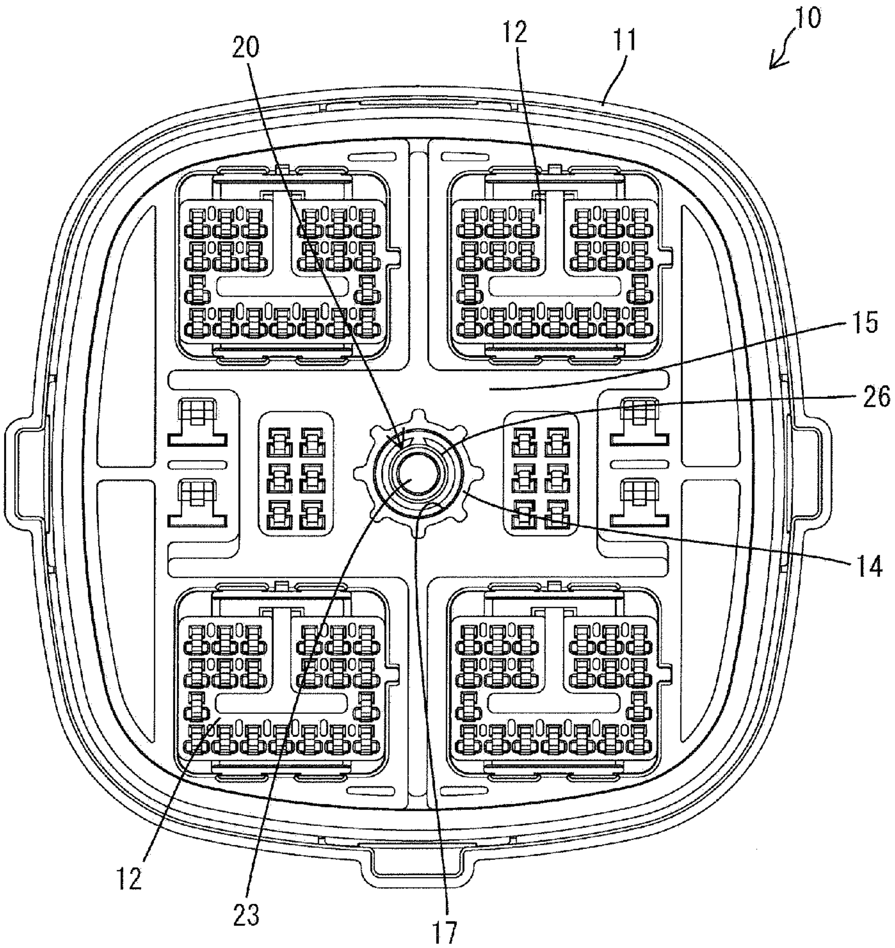
FIG. 6 is a front view of the first housing.

The first housing 10 includes a first frame 11 made e.g. of synthetic resin and first sub housings 12 made e.g. of synthetic resin are assembled into the first frame 11 from the front (left side in FIGS. 1 and 2). Female first terminal fittings 13 are mounted in each first sub housing 12 of the first housing 10. As shown in FIG. 6, the first frame 11 has a substantially square front shape, and a support 14 is formed unitarily in a central part of the first frame 11. As shown in FIGS. 1 and 2, the support 14 includes a part extending forward from a rear wall 15 of the first frame 11 and a part extending rearward from the rear wall 15. A circular insertion hole 16 penetrates from the front surface to the rear surface of the first frame 11 and a widened portion 17 is formed at the front of the insertion hole 16.

A bolt 20 is mounted in the support 14 while penetrating through the insertion hole 16. The bolt 20 has a substantially cylindrical shaft 21 and a head 22 is formed unitarily at the rear end of the shaft 21. The head 22 has a hexagonal outer periphery or any shape allowing for an operation of the bolt 20 such as a square or provided with Allen key shape (Imbuss). An externally threaded portion 23 is formed coaxially on a front portion of the shaft 21. Further, a circumferentially extending locking groove 24 is formed at a position on the shaft 21 rearward of the externally threaded portion 23. The head 22 has circular flange 25 substantially coaxial with the shaft 21 and having a larger diameter at the front end. The outer diameter of the flange 25 is substantially equal to the outer diameter of the support 14.

The bolt 20 is inserted into the insertion hole 16 from behind and a part of the shaft 21 in an area behind the locking groove 24 is accommodated in the insertion hole 16 for rotation about an axial line. A substantially U- or C-shaped retaining ring 26 is fit in the locking groove 24 near a rear part of the widened portion 17 of the insertion hole 16 and contacts a locking surface 28 at the rear end of the rear part of the widened portion 17 to prevent the bolt 20 from moving back and to retain the bolt 20 at the first housing 10. However, the bolt 20 can rotate relative to the first housing 10 by sliding in contact with the inner peripheral surface of the support 14. The head 22 and the flange 25 project back from the rear end of the support 14 when the bolt 20 is mounted in the support 24, and the externally threaded portion 23 projects forward from the front surface of the first frame 11.

Figure 5:
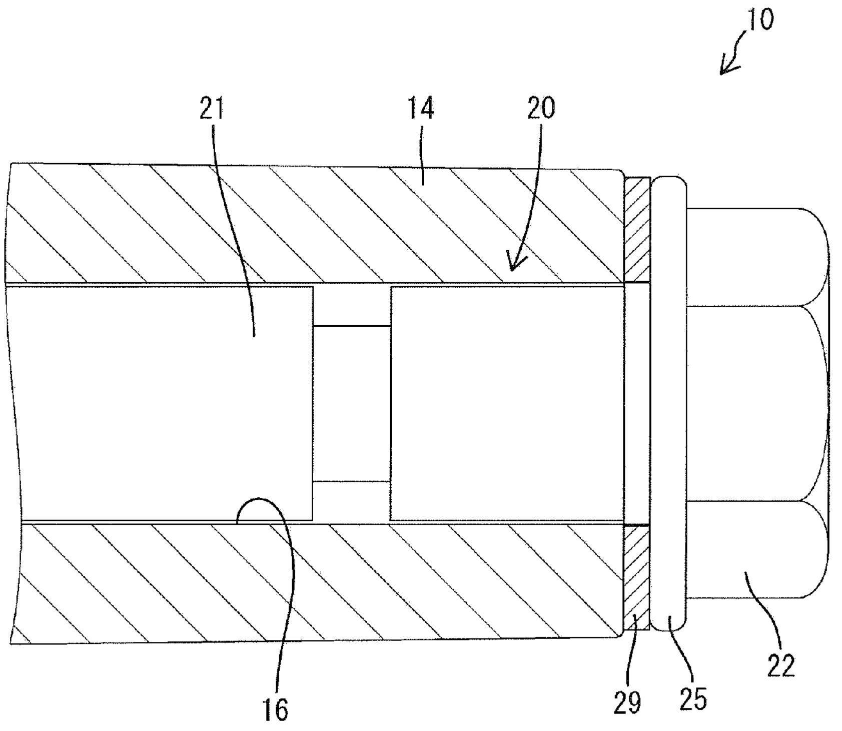
FIG. 5 is a partial enlarged section showing a state where a seal ring is mounted between a supporting portion and a head portion of a bolt.

As shown in FIGS. 1, 2 and 5, a seal ring 29 is mounted on a rear portion of the shaft 21 and is sandwiched between the rear surface of the support 14 and the front surface of the flange 25 in an axial direction AD. The seal ring 29 functions to prevent water from entering into a clearance between the inner periphery of the insertion hole 16 and the outer periphery of the bolt 20 from behind. In an unconnected state of the first and second housings 10 and 30, the bolt 20 is not fastened to the nut 36 and is slightly movable in the axial direction AD relative to the support 14 between a foremost position where the flange 25 contacts and compresses the seal ring 29 and a rearmost position where the retaining ring 26 contacts the locking surface 28 of the widened portion 17 of the hole 16. Accordingly, the seal ring 29 is neither deformed nor squeezed in the axial direction AD in the unconnected state of the housings 10, 30.

Figure 3:
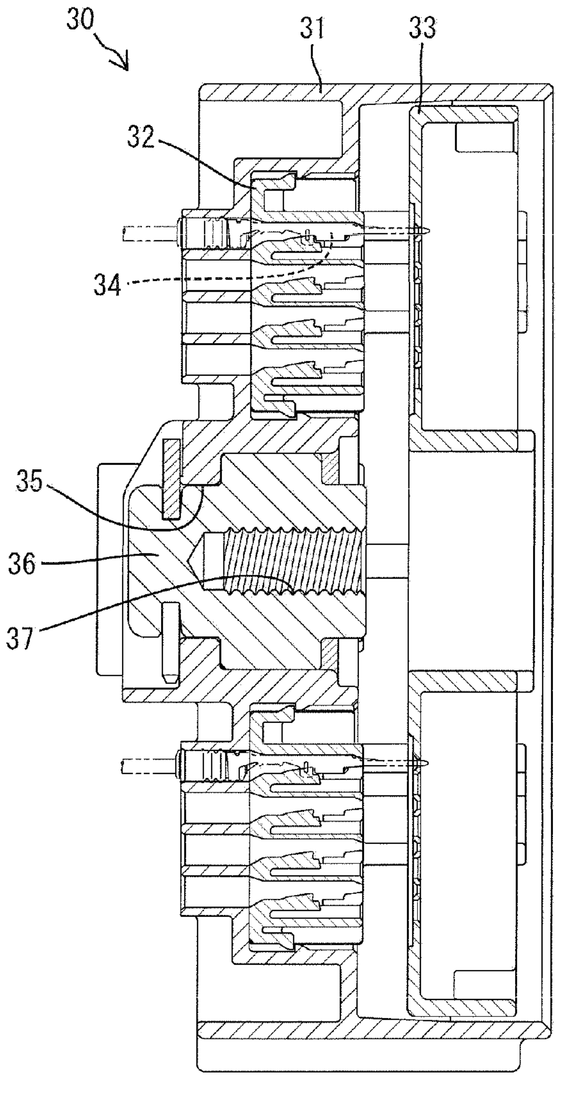
FIG. 3 is a section of the second housing.

As shown in FIGS. 1 and 3, the second housing 30 includes a second frame 31 made e.g. of synthetic resin, second sub housings 32 made e.g. of synthetic resin and assembled into the second frame 31 from the front (right side in FIGS. 1 and 3), and a moving plate 33 mounted on the second frame 31 from the front. Male second terminal fittings 34 are mounted in each second sub housing 32, and tabs at the leading ends of the respective second terminal fittings 34 are inserted through positioning holes of the moving plate 33.

Figure 7:
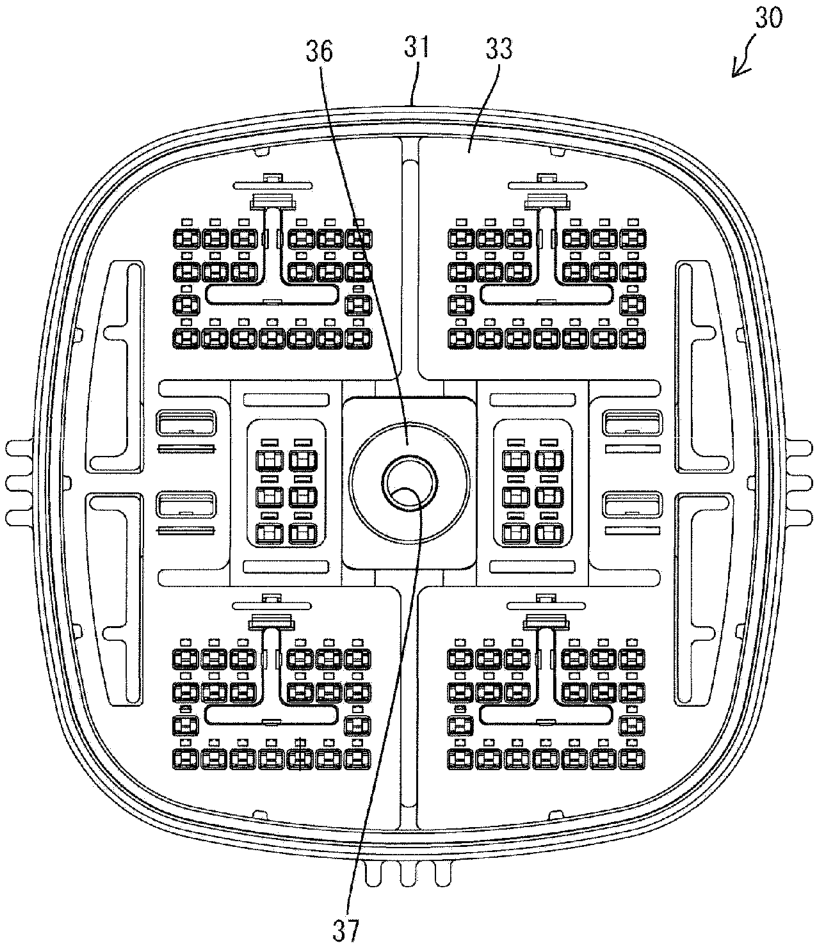
FIG. 7 is a front view of the second housing.

As shown in FIG. 7, the second frame 31 has a substantially square front shape conforming to the front shape of the first housing 10 and a tubular mounting portion 35 penetrates from the front surface to the rear surface in a central part of the second frame 31. The nut 36 is mounted in the tubular mounting portion 35 with relative movements in the axial direction AD and rotation about the axial line prevented. The mounted nut 36 is embedded in the front surface of the second housing 30 and may be insert molded into the second housing 30 or maintained therein by retaining means, such as splices, retaining rings or the like. As shown in FIGS. 1 and 3, the nut 36 has a forwardly open internally threaded portion 37. The inner diameter of the trough of the internally threaded portion 37 is slightly larger than the outer diameter of the externally threaded portion 23 of the bolt 20. Further, the depth of the internally threaded portion 37 in the axial direction AD exceeds the length of the externally threaded portion 23 of the bolt 20 in the axial direction AD.

The two housings 10, 30 are fit lightly together with their front surfaces facing each other and the externally threaded portion 23 of the bolt 20 threadedly engaged with the internally threaded portion 37 of the nut 36. The bolt 20 then is rotated in a tightening direction e.g. by engaging a jig (not shown) with the head 22. Thus, the bolt 20 moves closer to the nut 36 in the axial direction AD by the engagement of the threaded portions 23 and 37. This movement of the bolt in the axial direction AD, causes the flange 25 of the bolt 20 to press the support 14 forward toward the second housing 30 via the seal ring 29 so that the first housing 10 moves toward the second housing 30.

Figure 4:
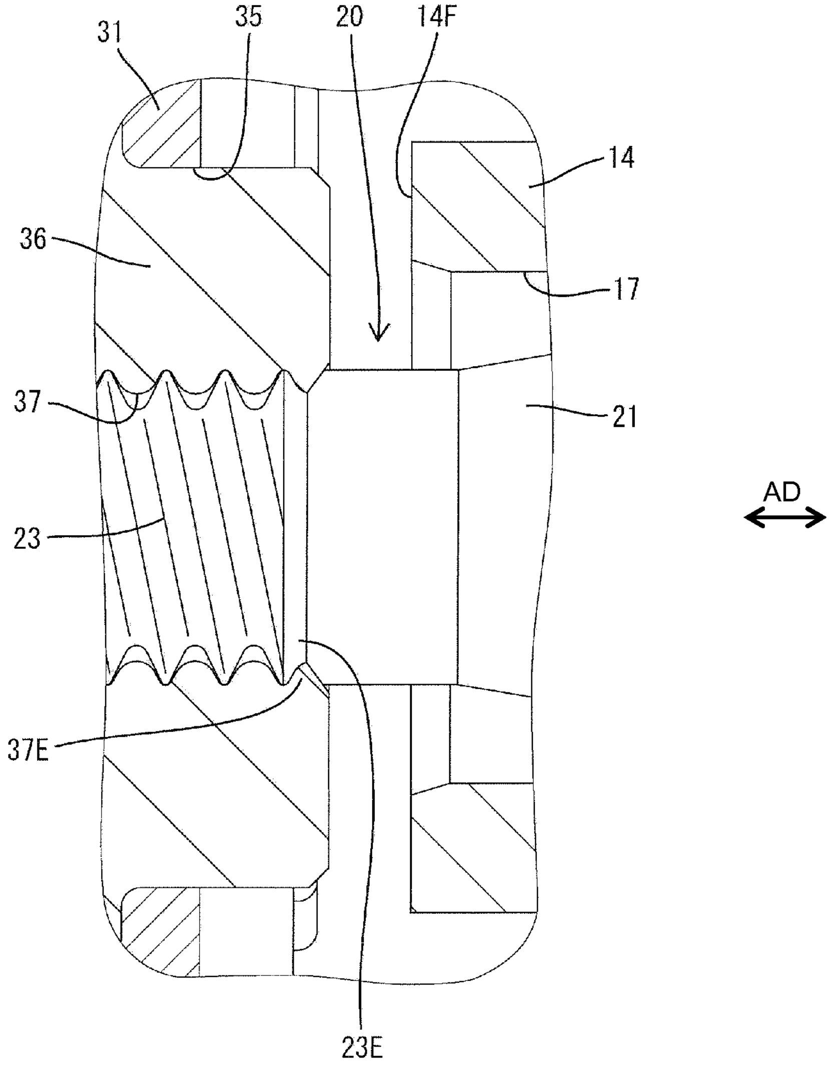
FIG. 4 is a partial enlarged section showing a stopper means.

A rear end 23E of the externally threaded portion 23 of the bolt 20 contacts a front end portion 37E of the internally threaded portion 37 of the nut 30, as shown in FIG. 4, when the two housings 10, 30 reach a properly connected state. The rear end 23E is a transitional part between the externally threaded portion 23 and the a portion of the bolt 20 having no external thread and is axially in front of the retaining ring 26. This direct contact of metal parts fixes a positional relationship of the bolt 20 and the nut 36 in the axial direction AD and prevents further tightening of the bolt 20 even if a tightening torque to the bolt 20 varies. In this way, tightening of the bolt 20 is completed and the two housings 10, 30 are held in the connected state.

A front end 14F of the support 14 does not contact the first frame 11 of the first housing 10 or the nut 36 when the two housings 10, 30 are connected, and a clearance is formed between front surfaces of the nut 36 and the support 14. That is, a pressing force acting back toward the head 22 of the bolt 20 due to the tightening of the bolt 20 is not applied to the support 14. In this way, the squeezing amount of the seal ring 29 between the rear surface of the support 14 and the head 22 of the bolt 20 in the axial direction AD is stable.

The connector includes the first housing 10 and the support 14 made e.g. of synthetic resin. The insertion hole 16 penetrates from the front surface to the rear surface of the first housing 10 and is part of the first housing 10. The metal bolt 20 rotatably penetrates through the insertion hole 16. The seal ring 29 is mounted between the rear surface of the support 14 and the head 22 of the bolt 20. The second housing 30 is connected to the first housing 10 with the front surfaces of the housings facing each other. The metal nut 36 embedded in the front surface of the second housing 30 and connects the two housings 10, 30 by being threadedly engaged with the bolt 20. A stopper means (particularly the end of the externally threaded portion 23 and the end of the internally threaded portion 37) are provided for preventing further threaded movement of the bolt 20 by bringing the metal parts into contact with each other.

According to this construction, the squeezing amount of the seal ring 29 is stable since the tightening amount of the bolt 20 is specified by the contact of the metal parts in the stopper means with the bolt 20 tightened and the two housings 10, 30 connected. In this way, stable sealing performance by the seal ring 29 is realized. Further, contacts of the metal parts are difficult to loosen due to a difference in coefficient of thermal expansion. Thus, the bolt 20 is difficult to loosen. Furthermore, the stopper means directly brings the end 23E of the externally threaded portion 23 formed on the bolt 20 and the end 37E of the internally threaded portion 37 formed in the nut 36 into contact, the bolt 20 and the nut 36 can be utilized effectively while remaining in existing shapes.

The invention is not limited to the above described embodiment. For example, the following embodiments also are included in the scope of the invention.

The end of the externally threaded portion of the bolt and the end of the internally threaded portion of the nut are brought into contact with each other as the stopper means in the above embodiment. However, the invention is not limited to this. A contact spaced from the externally threaded portion of the bolt and the end of the internally threaded portion of the nut may be brought into contact, or the end of the externally threaded portion of the bolt and a contact portion (such as a flange) spaced from the internally threaded portion of the nut may be brought into contact, or a contact portion formed at a distance from the externally threaded portion of the bolt and a contact portion at a distance from the internally threaded portion of the nut may be brought into contact.

The bolt and the nut directly contact as the stopper means in the above embodiment. However, the invention is not limited to this and the end of the externally threaded portion may be brought into contact with a metal part other than the nut or the end portion of the internally threaded portion (such as a metal flange on the nut) may contact a metal part other than the bolt. In this case, the ends of the externally and internally threaded portions may be brought into contact with one common metal part.

What is claimed is:

1. A connector, comprising:

a first housing having a support formed with an insertion hole penetrating from a front surface to a rear surface of the first housing;

a metal bolt having a shaft and an externally threaded portion formed coaxially on a front portion of the shaft and a rear end of the externally threaded portion defining a first metal stopper, the metal bolt rotatably penetrating through the insertion hole;

a seal mounted between a rear end surface of the support and a head of the bolt;

a second housing to be connected to the first housing with the front surface of the first housing facing a front surface of the second housing; and a metal nut having an internally threaded portion retained in the second housing, a front end of the internally threaded portion defining a second metal stopper, the internally threaded portion of the metal nut and the externally threaded portion of the bolt threadably engaged with each other to connect the first and second housings, wherein the first metal stopper contacts the second metal stopper to prevent a threaded movement of the bolt beyond a specified position when the first and second housings reach a properly connected state.

2. The connector of claim 1, wherein the support is made of synthetic resin.

3. The connector of claim 2, wherein the metal nut is embedded in the front surface of the second housing.

4. The connector of claim 1, wherein a depth in an axial direction of an internally threaded portion of the nut exceeds a length in the axial direction of an externally threaded portion of the bolt.

5. The connector of claim 1, wherein the bolt is retained at the first housing by contacting a retaining ring and a locking surface of the housing and allowed to rotate relative to the first housing by sliding in contact with an inner peripheral surface of the support.

6. The connector of claim 1, wherein the first housing includes a first frame and first sub housings into which terminal fittings are inserted and to be assembled into the first frame, wherein the support is unitary with the frame.

7. The connector of claim 1, wherein the nut is mounted in a tubular mounting portion of the second housing with relative movements in the axial direction and rotation prevented.

* * * * *